(12) United States Patent
Chapman

(10) Patent No.: US 6,818,685 B1
(45) Date of Patent: Nov. 16, 2004

(54) INK-RECEPTIVE COATINGS AND RECORDING MEDIUM PREPARED THEREFROM

(75) Inventor: David Monroe Chapman, Ellicott City, MD (US)

(73) Assignee: W. R. Grace & Co. -Conn., Columbia, MD (US)

( * ) Notice: Subject to any disclaimer, the term of this patent is extended or adjusted under 35 U.S.C. 154(b) by 0 days.

(21) Appl. No.: 09/350,060

(22) Filed: Jul. 8, 1999

Related U.S. Application Data

(60) Provisional application No. 60/092,139, filed on Jul. 9, 1998.

(51) Int. Cl.[7] ............................. C08K 9/00; C08L 63/00
(52) U.S. Cl. ...................... 523/440; 523/201; 523/205; 523/206; 523/443
(58) Field of Search ................................. 523/201, 205, 523/206, 440, 443; 428/219, 323, 331, 328, 329, 340, 341, 411.1, 500, 480, 483, 515, 926

(56) References Cited

U.S. PATENT DOCUMENTS

| | | | |
|---|---|---|---|
| 3,007,878 A | 11/1961 | Alexander et al. | 252/313 |
| 3,620,899 A | 11/1971 | Kelly et al. | 161/162 |
| 4,115,474 A | * 9/1978 | Vassiliades et al. | 260/855 |
| 4,157,920 A | 6/1979 | Wason et al. | 106/292 |
| 4,383,057 A | 5/1983 | Yamamoto et al. | 523/333 |
| 4,792,487 A | 12/1988 | Schubring et al. | 428/342 |
| 4,818,779 A | 4/1989 | Witucky et al. | 524/188 |
| 4,912,149 A | 3/1990 | Robeson et al. | 524/501 |
| 5,110,769 A | 5/1992 | Welsh et al. | 501/12 |
| 5,171,777 A | 12/1992 | Kuphal et al. | 524/522 |
| 5,320,898 A | 6/1994 | Yoshida et al. | 428/195 |
| 5,494,759 A | 2/1996 | Williams et al. | 428/514 |
| 5,660,928 A | 8/1997 | Stokes et al. | 428/331 |
| 5,720,806 A | 2/1998 | Fujii et al. | 106/483 |
| 5,827,363 A | 10/1998 | Darsillo et al. | 106/484 |
| 6,110,585 A | 8/2000 | Shaw-Klein | 428/341 |

FOREIGN PATENT DOCUMENTS

| | | |
|---|---|---|
| DE | 195 34 327 A1 | 2/1996 |
| EP | 0 650 850 A2 | 3/1995 |
| EP | 0 586 846 B1 | 10/1996 |
| EP | 0 818 321 A1 | 1/1998 |
| EP | 0 825 031 A1 | 2/1998 |
| EP | 0 799 136 B1 | 7/1998 |
| GB | 2 213 078 A | 9/1989 |
| JP | HEI 10-114142 | 5/1998 |
| JP | HEI 10 114143 | 5/1998 |
| JP | HEI 10 193776 | 7/1998 |
| JP | HEI 10-324055 | 12/1998 |
| JP | HEI 10-324056 | 12/1998 |
| WO | WO 97/01447 | 1/1997 |
| WO | WO 97/01448 | 1/1997 |

OTHER PUBLICATIONS

D. M. Chapman, "Coating Structure Effects on Inkjet Print Quality," Proceedings of the TAPI Coat Conference 1997, pp 73–93.
I. M. Krieger, "Adv. Coll. Interface Sci.," 1972, 3, 111.
Undated Bulletin from Rohm and Haas Company entitled, "Binders: Specialty Polymers For Paper And Paperboard".
Information Bulletin from Air Products and Chemicals, Inc. dated 1981 entitled, "VINAC XX Polyvinyl Acetate Homopolymer Emulsions For Adhesives".

* cited by examiner

Primary Examiner—Sheeba Ahmed
(74) Attorney, Agent, or Firm—William D. Bunch

(57) ABSTRACT

The coating composition comprises inorganic oxide, e.g., silica, in combination with a binder system comprising a mixture of a water soluble polymer and non-ionic latex polymer. The composition may contain optional dye mordant (e.g., cationic polymer). It is found that the combinations of these components result in relatively high solids formulations (e.g., greater than 20% by weight) with relatively low viscosity (less than 5000 centipose), do not exhibit coating dusting, and give exceptional ink-jet printability. These formulations are especially suitable for preparing on-line formulations because they can be formulated to have a viscosity less than 2000 centipose. Preferable embodiments for online coatings have a viscosity less than 1000 centipose.

21 Claims, 6 Drawing Sheets

INK-RECEPTIVE COATINGS AND RECORDING MEDIUM PREPARED THEREFROM

RELATED APPLICATION

This application is a continuation-in-part application of provisional application 60/092,139, filed Jul. 9, 1998, the contents of which are incorporated by reference.

BACKGROUND

The invention relates to ink-receptive coating compositions, particularly ink receptive coatings for inkjet papers, and recording medium prepared from such coatings, e.g., inkjet paper.

Inkjet printing comprises applying ink droplets to a recording medium, 1:1 usually paper. The most frequently used inkjet processes utilize thermal (bubble) and/or piezo electric processes which create and project a droplet of ink from a nozzle.

Inks used in inkjet printing processes are generally aqueous solutions containing a variety of functional additives. In general, these solutions contain azo dyes having a water solubility which can be specifically adjusted by the incorporation of hydrophilic side chains. These dyes are generally anionic.

These processes and ink formulations have to be taken into account when preparing the recording medium. Indeed, one typically strives to address the following criteria when designing a recording medium for inkjet processes.

1. Controlled ink absorption of the ink droplets so that the absorbed ink forms circular spots of ink with smooth peripheral lines thereby imparting high resolution.
2. High absorption rate of ink to reduce smearing.
3. Low penetration depth of the dyes so as to form high optical density images and reduce "show-through" or penetration of the ink spots.
4. High affinity between the color dye and print medium to enhance color fastness.
5. Color appearance and fidelity for a spectrum of dye colors.
6. High whiteness to achieve good contrast to the ink.
7. Resistance to yellowing and fading of colors.
8. Resistance to aqueous or alcohol solutions.
9. High ink absorbing capacity so as to receive the amounts of ink necessary for dense images.
10. Minimal dusting from the final recording medium product.

The structure and composition of the recording medium significantly contributes towards meeting these criteria. Typically, recording media such as paper which has only been sized on the surface cannot meet these needs. As a result, specially designed inkjet printing papers have been developed. These papers consist of a paper substrate on which an ink receptive coating layer has been applied to at least one surface. These coatings can be applied while the paper is being made, i.e., "online". The coatings can also be applied after the paper has been made. That process is sometimes referred to as "offline".

A number of binders have been used to coat these papers and have been identified as having an effect on one or more of the above properties. The binders generally include water soluble film formers and/or latex polymers. WO 97/01447 discloses using water soluble polyvinyl alcohol and various types of latex such as vinylacetate latex, including vinyl acetate copolymers and homopolymers. The binders can be cationic, anionic and/or nonionic. Polyvinyl alcohol is a typical binder for pigmented coatings. Certain polyvinyl alcohols are not only good film formers which bind the pigment particles, but they also are hydrophilic and help limit diffusion of the inks within the pigment coating. See EP 825 031.

The ink receptive coating also can contain highly absorptive pigments in order to assist meeting the earlier mentioned criteria. Highly porous silica pigments have been especially successful in meeting those needs. However, when porous silicas are combined with conventional binders, e.g., polyvinyl alcohol, there is a maximum amount of silica that can be added before the formulation becomes too viscous for most practical uses. Indeed, typical binders, such as polyvinyl alcohol, are only available at low solids content, e.g., 10% by weight solids. As a result, most silica-containing formulations are prepared at a low solids content after dispersion. Such low solids formulations are not the most efficient or economical to use in current paper making processes.

For example, paper is made by processing a continuously moving web of substrate. As a result, an efficient application of a coating to this web comprises applying the coating directly "online" during the manufacturing process, or applying the coating offline after the paper has been made by w applying the coating to the paper as it is run off a spool. With either method, it has been established that a certain amount of solids needs to be applied to the web or paper to create coating integrity, as well as to impart the print properties mentioned above. Moreover, the solids content and the viscosity of the coating determine how fast the coating can be efficiently applied to the moving web and still result in an adequate coating. In general, the higher the solids and the lower the viscosity, the faster the coating can be applied to the moving web. Reasonable line speeds for online processes are 200 feet per minute or faster. The faster the whole process can be run, the more efficient the whole manufacturing process becomes. On the other hand, a low solids formulation usually means a slower line speed and, as mentioned above, attempts to add more solids to conventional low solids silica-containing formulations has resulted in formulations which are too viscous to be applied online.

Certain low solids coating composition also tend to rub off and create dust after the coating is dried, and can result in a coating that does not bind to the substrate. Conventional low solids formulations also typically need additional components such as dye mordants due to the anionic nature of inkjet dyes and/or binders for some formulations. These coatings also incur increased expenses from drying lower solids materials.

It also is difficult to reduce or minimize the disadvantages of low solids coatings while at the same time maintaining or maximizing the ink receptive properties desired, especially when the coating also contains additional components, e.g., cationic polymeric dye mordants such as polydiallyl dimethyl ammonium chloride. See U.S. Pat. No. 5,494,759 and EP 799 136. These additives impart water fastness to the dyes that are applied to the coating. Indeed, it has been generally acknowledged that it is difficult to achieve coating formulations having more than 20% solids by weight. See U.S. Pat. No. 5,827,363. Accordingly, there have been attempts to solve the problems associated with those formulations.

For example, DE 195 34 327 discloses preparing coatings containing cationic and/or nonionogenic binders in combination with pigment particles having cationic surface charge to increase solids content. This patent suggests that formulations having solids content up to 70% by weight can be obtained using these formulas. However, the pigments disclosed in DE 195 34 327 include calcium carbonate and fumed silicas. These pigments have limited porosity, and it is envisioned that the coating's overall ink capacity is limited when using these pigments. It also is envisioned that higher than necessary pigment will be needed to obtain the derived ink absorption properties. In addition, media prepared from certain cationic binders such as those suggested in this patent also could benefit from some improvements in terms of print performance.

U.S. Pat. No. 5,720,806 discloses coating compositions comprising 1–30% solids by weight. This patent, however, fails to disclose specific examples of binder formulations, much less disclose a formula which achieves a high level of solids in a formulation and yet has low viscosity and results in suitable ink receptive coatings. U.S. Pat. No. 5,720,806 is concerned with improving coating formulations by adding small amounts of alumina to silica pigment, i.e., less than 1% by weight based on the silica.

Therefore, there is still a need for a coating having a relatively higher solids content, e.g., greater than 20%, so that the coating is not only less viscous to meet the needs of manufacturing the medium in a more efficient manner, but also imparts properties that meet the print performance needs for recording medium in the inkjet area.

SUMMARY OF THE INVENTION

It is an object of this invention to address several of the aforementioned problems associated with ink-receptive coatings comprising porous pigments such as silica-based pigments. These problems include low formulation solids content, lack of adherence of the dried coating to the substrate paper (coating dusting) and poor inkjet printability. These problems are especially noted for coating formulations applied online as paper is being made.

It has been discovered that by combining (a) a nonionic latex with (b) conventional water-soluble polymer binders and (c) cationic porous inorganic oxides, one can obtain a coating composition having a solids content of at least 20% by weight and a Brookfield viscosity of 5000 centipose or less. Indeed, one can obtain a solids content of about 25 to about 40% by weight, and preferably 30% to 40% solids, and Brookfield viscosities less than 2000 centipose using this composition. It has also been shown that the print properties required of inkjet paper can be met using these formulations. Cationic dye mordants can also be employed without significantly affecting the desired solids content and coating viscosity.

DETAILED DESCRIPTION

Non-Ionic Latex

Figure 1:
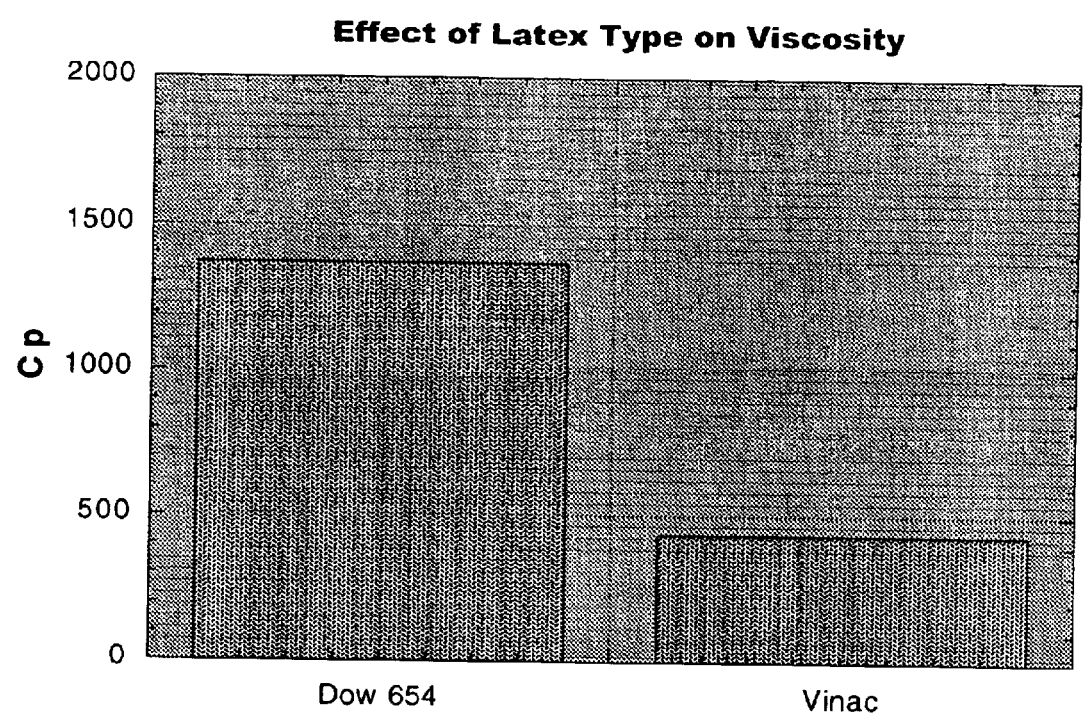
FIG. 1 compares the viscosity of the inventive coating in centipose (cp) against the viscosity of a coating outside the scope of the invention.

It has been found that the nonionic latex polymer is an important aspect of the invention in terms of obtaining a high solids content formulation while also achieving good print properties and relatively low viscosity so that the coating can be effectively used for online applications. The nonionic nature of this component makes it compatible with conventional coating binders such as polyvinyl alcohol.

Latex polymers are well known to those having ordinary skill in the art. The term "latex polymer" or "latex" is used herein in the conventional sense to mean a water insoluble polymer which is generally available as a dispersion of water insoluble polymer particles. Polymer is intended herein to embrace homopolymers and copolymers, including random, block, graft or alternating polymers of two or more monomers. The nonionic latex polymer may also be a mixture of two or more polymers so long as the overall nature of the latex is nonionic.

The term "nonionic" is used herein to refer to materials which are generally neutral. However, nonionic polymers may also include materials having zeta potentials that vary slightly in the negative or positive direction. In practice, materials are seldom perfectly neutral. Latexes available as nonionic latex can indeed have zeta potentials as much as ±30 mV. The measured zeta potential depends on conditions under which the zeta potential is measured.

Nonionic vinyl acetate polymers are examples of suitable nonionic latex polymers. Suitable nonionic vinyl acetate copolymers include ethylene/vinyl acetate copolymer emulsions. Polyvinyl acetate homopolymers are preferred for this invention.

Polyvinyl acetate polymers and methods for preparing them are known to those skilled in the art. See U.S. Pat. Nos. 4,912,149; 5,171,777; and 4,818,779. They can be prepared by conventional suspension, solution, bulk or emulsion polymerization techniques.

Although vinyl acetate homopolymers or polymers which are essentially all (for example, 95% or more) vinyl acetate are preferred in this invention, various copolymers of vinyl acetate, such as those mentioned above, can be used. In general copolymers can be used provided that the comonomer is not present in an amount of 50 wt. % or more. The comonomer also should be such that the latex is or can be modified to be nonionic. In addition to ethylene mentioned above, examples of suitable comonomers include propylene, butene, hexene, vinyl chloride, vinylidene chloride, acrylates such as methylmethacrylate, ethylmethacrylate, N-butylacrylate, methylacrylate, ethylacrylate, 2-hexylacrylate, styrene, acrylonitrile, cyclohexylmethylacrylate, maleic anhydride, vinyl methyl ether, vinyl ethyl ether, acrylic acid and the like. If such copolymers are used, it is more preferable that the vinyl acetate polymer contain at least 75 wt. %, and preferably at least 95 wt. %, vinyl acetate units in order to obtain the best results. As disclosed later below, coatings containing vinyl acetate provide good print performance.

An especially preferred latex polymer comprises a core and nonionic shell. Such compounds are known in the art.

See U.S. Pat. No. 3,620,899. The shell around the core can be created by addition of a protective colloid which is added when the latex is prepared. The amounts of colloid added to create shells around a polymer core can vary, but in general, can be between about 1 and 20 percent, and preferably between about 2 and 15 percent by weight, based on the polymer solids so as to protect the dispersion. These protective colloids are also commercially available and often are included in the polymer composition as it is marketed commercially. Suitable protective colloids include, but are not limited to, carboxymethyl cellulose, hydroxyethyl cellulose, polyvinyl alcohol, gum agar, gelatin, gum arabic, and the like. A preferred protective colloid material is polyvinyl alcohol, i.e., substantially fully hydrolyzed polyvinyl acetate, and may be used in molecular weights ranging from low to medium, medium to high and high molecular weights.

Vinac™ XX210 from Air Products is an example of such a core/nonionic shell latex and has been shown to provide coating mixtures with low viscosity, as well as to provide a coated media having good print properties. This latex polymer has a core of poly(vinylacetate) and a nonionic shell of poly(vinylalcohol). Without being bound by any particular theory, it is believed that latex polymers with charged shells, and in particular, those with negative surface charge, such as certain styrene-butadiene latexes, interact with cationic groups on polyethylene imine or poly(diallyldimethylammoniumchloride) dye mordants, thus adversely increasing viscosity and even gelling the coating formulation. By contrast, it is found that the nonionic latexes of the present invention are compatible with the other components in the formulation. Compatibility in this regard means that the system will not gel or have disproportionately high viscosities. Also, it is believed that a core comprising poly(vinylacetate) gives better image quality than latexes with different core compositions (such as styrene-butadiene polymers).

The preferred latex polymers are also typically available in high solids emulsions. Generally they are available at solids contents of 40% by weight or greater, and therefore contributes towards increasing the overall solids content of the formula. Preferred embodiments have solids contents of 50% by weight a or greater.

Water Soluble Polymer

The water soluble polymer should be one that is compatible with the nonionic latex polymer because it is used as a cobinder with the nonionic polymer latex. The water soluble polymer is added to increase the mechanical strength of the final coating, as well as impart workability of the coating as it is applied to a recording medium substrate such as paper. The water soluble polymer in general should be a good film former.

A "water soluble polymer" can be defined as in EP 818 321. For example, it can refer to a polymer which dissolves in water completely as characterized by the hydrodynamic particle diameter in water as measured by light scattering. For purposes of the present invention, a polymer with a light scattering hydrodynamic particle diameter, in water, of no more than 0.05 µm indicates molecular scale dissolution. A polymer with a light scattering hydrodynamic particle diameter, in water, of no more than 0.5 µm is referred to herein as a water soluble polymer.

A water insoluble polymer, on the other hand, refers specifically to polymers which form a dispersion in water characterized by the hydrodynamic particle diameter, in water, of greater than 0.05 µm as determined by light scattering. This implies a dispersion of aggregates containing more than one molecule requiring solubilization by surfactants. See EP 818 321.

In general, the water soluble polymers of this invention are also hydrophilic. The term "hydrophilic," as used herein, is used to describe a material that is generally receptive to water, either in the sense that its surface is wettable by water or in the sense that the bulk of the material is able to absorb significant quantities of water. More specifically, materials that exhibit surface wettability by water are said to have hydrophilic surfaces, while materials that have surfaces that are not wettable by water are said to have hydrophobic surfaces. See EP 650 850.

Suitable water soluble and hydrophilic polymers include those disclosed in GB 2213078 and can be selected from the group consisting of, for example, polyvinyl alcohol, hydroxyethyl cellulose, methyl cellulose, dextrin, pluran, gelatin, starch, gum arabic, dextran, polyethylene glycol, polyvinyl pyrrolidone, polyacrylamide, polypropylene glycol, and mixtures thereof.

In a preferred embodiment of the invention, the water soluble polymer is polyvinyl alcohol. Fully hydrolyzed or partially hydrolyzed polyvinyl alcohols are suitable.

The water soluble polymer and latex components of the system should be selected to maximize solids content of the formulation. For example, water soluble polymers such as polyvinyl alcohol (PVOH) binders can only be dissolved at relatively low solids, e.g., 15 wt. %. By contrast, latex emulsions are typically supplied at much higher concentrations, e.g., 50–55%. Thus, to benefit from high solids in the coating solution, it is desirable to employ as much of the high solids binder solution (latex) as possible, while minimizing the amount of low solids binder solution (PVOH). Therefore, in general, mixtures rich in latex are most desirable from the standpoint of providing the highest solids content in the formulation, other factors being equal. To illustrate this aspect, the example given above (200 gms of PVOH at 15% solids mixed with 127.3 gm latex at 55% solids) gives a latex/PVOH ratio of 70/30 on a solids basis, and a total formulation solids of 37% when mixed with the silica and water. By contrast, if the ratio of these components is changed to 30/70, the total solids of the formulation becomes 27% with all other factors being constant.

The particular water soluble polymers and latex should also be selected to minimize viscosity. First, with regard to PVOH polymers, it is known that the viscosity of solutions of PVOH increases in relation to the molecular W weight of the PVOH. Thus, for example, a 4% by weight solution of Airvol 107 (fully hydrolyzed, low molecular weight PVOH from Air Products) gives a solution viscosity of 5.5–6.6 cp, while a 4% solution of Airvol 325 (fully hydrolyzed, high molecular weight PVOH from Air Products) gives a solution viscosity of 28.0–32.0. Thus, from the standpoint of minimizing the viscosity of the formulation, it is preferable to use a relatively low molecular weight PVOH in the formulation, and preferably a polyvinyl alcohol which in a 4% by weight solution has a viscosity less than 32 centipose.

Cationic Porous Inorganic Oxide

The porous inorganic oxides used to formulate the invention are those inorganic oxides known for their highly porous nature and are defined as those having pore volumes of 0.6 cc/g or more. In general, porous inorganic oxides having volumes in the range of 0.6 to 3.0 cc/g are suitable. Particularly preferred inorganic oxides are those having pore volumes in the range of 0.9 to about 2.5 cc/g, and most preferably are those having pore volumes in the range of 0.9 to 2.0 cc/g. Suitable inorganic oxides have surface areas in the range of 100 to 600 $m^2/g$ and preferably 200 to 500 $m^2/g$.

In order for the porous inorganic oxide to be used as a pigment for an ink receptive coating, the inorganic oxide in general should have an average particle size of 20 micrometers or less. In general, the average particle size should be in the range of 1 to 20 microns, preferably about 3 to about 12 microns, with most preferred sizes being in the range of 5 to 8 microns.

Silica gels are particularly preferred porous inorganic oxides, with silica hydrogels being especially preferred. The term "hydrogel" is referred to herein as material such as that which has been gelled and which has significant amounts of volatiles contained within the porous network of the gel. Hydrogels will typically contain 40% by weight or more volatiles. Hydrogels and methods for making them are known in the art. An example of a suitable hydrogel is disclosed in U.S. Pat. No. 5,110,769, the contents of which are incorporated herein by reference. Precipitated silica (especially high structure, reinforced precipitated silica), aerogels, xerogels, cogels and other inorganic oxides such as alumina, silica/alumina and titania may also be used.

The pore volume of the porous inorganic oxides is generally measured using nitrogen porosimetry. However, it is known that with inorganic oxides having pore diameters in excess of 60 nanometers, the pore volume is normally measured using mercury porosimetry. For hydrogels, the skilled artisan typically uses total volatiles content to measure pore volume. For example, the pore of a hydrogel can be determined by measuring the volatiles content (TV) of the hydrogel after heating to a high temperature (such as 1,750° F.). The pore volume (PV) can be calculated with the following equation for 100 g of sample:

$$PV(cc/g) = \frac{TV}{100 - TV}$$

The porous inorganic oxide also possesses an overall cationic character. The inorganic oxide can be inherently cationic, or the inorganic oxide can be modified or treated to be cationic. The term "treated" includes processes in which an agent is added during manufacture of the inorganic oxide so that the final inorganic oxide product is cationic. Suitable treatment processes also include those in which a previously prepared inorganic oxide is coated or reacted with an agent to render the surface of the inorganic oxide cationic. In addition, suitable treatments include adding, an agent to a formulation which contains or will contain inorganic oxide, and from that formulation the inorganic oxide silica becomes cationic. Preferred porous inorganic oxides exhibiting a cationic charge are silica-based pigments which have been treated with an agent to render it cationic. In general, silica is anionic.

A particularly preferred cationic porous oxide is that prepared by treating silica, especially a silica hydrogel, with alumina. A preferred manner of treatment comprises mixing silica with a soluble alumina source such as aluminum chlorhydrol, i.e., $[Al_2(OH)]CL$, in an aqueous suspension. The alumina reagent strongly adsorbs onto the silica surface. Such techniques are known in the art. U.S. Pat. No. 3,007,878, the contents of which are incorporated by reference, discloses suitable techniques for preparing cationic materials of the nature employed in this invention.

It is particularly preferable to use cationic inorganic oxides so as to increase the adhesion between the inorganic oxide and the binder. Increased adhesion the between the inorganic oxide and binder serves to minimize or completely eliminate dusting problems. With respect to modifying silica with alumina to render the silica cationic, alumina is a more basic oxide than silica, and it is believed that alumina modification of the silica surface enhances the interaction of the silica with the mildly acidic alcohol groups on poly (vinylalcohol) by increasing the strength of acid-base interactions between the inorganic and binder.

Other agents which can be used to render the inorganic oxide cationic include the cationic organic dye mordants described later below. In the event that organic agents are added to render the inorganic oxide cationic, the overall treated material is still referred to herein as inorganic.

Formulating

The formulation of the above components is prepared preferably as an aqueous dispersion. The nonionic polymer latex and water soluble polymer are generally added, respectively, in a weight ratio of 0.2 to 5.0, with rich latex ratios of about 1.0 to about 5.0 being preferred. These two components are cobinders and form all or at least part of the binder of the composition. Minor amounts of additional binders can be added, provided the stability of the overall coating is not significantly reduced and the above ratio is maintained.

The porous inorganic oxide is generally added in amounts suitable for imparting the print properties desired for inkjet recording medium. In general, the porous inorganic oxide can be from 20 to 80% by weight (solids basis) of the composition, but preferably should comprise at least 40 or 50% or more of the composition on a solids basis. It is especially preferable that the solids weight ratio of porous inorganic oxide compared to the total solids for the binder be about 1.0 and in certain formulas as high as 3.0.

In embodiments in which the porous inorganic oxide is a cationically modified silica, the modifying agent can be added to the silica prior to being formulated with the polymeric binders. In general, and especially if alumina is used to modify the silica surface, the agent is added in amounts to sufficiently cover the surface of the silica particles. In general, the amount of the cationic agent relative to the amount of inorganic oxide, e.g., silica, will be at least 2% by weight on a solids basis and in preferred embodiments about 6 to 20% by weight.

In other embodiments, the agent can be added at the time the inorganic oxide is being added to one or more of the other components in the composition. In that case, they are added to result in the above referenced amounts.

The compositions can also comprise additional components, especially those shown to enhance print properties of inkjet recording media. These include dye mordants which impart water fastness to the dyes once they are applied to the ink receptive coatings of the media. These mordants include cationic polymers such as cationic polyacrylamide, cationic polystyrene copolymers, polydimethyl diallyl ammonium chloride, polyamine polyamide epichlorohydrin (polyamide polyamine epichlorohydrin), polyethylene imine, polyamine sulfone, and the like. These polymers may be used alone or as part of a mixture of two or more polymers.

Other optional components include optical brighteners such as stilbene-2,2'-disulfonic materials available from Ciba Specialty Chemical as Tinopal™ SEP and stilbene-triazine aqueous dispersions available as Tinopal HST (22–26% solids) and Tinopal SCP (13–14% solids) also from Ciba. The additional components can comprise in the range of 1 to about 10% by weight of the total formulation, with specific amounts depending on the desired print properties and the solids content needed to apply the coating. Other additives include binder crosslinkers, fillers, dispersants, lubricants, preservatives and the like.

All of the various components can be added to the formulation using formulating techniques known in the art. When using anionic inorganic oxides, e.g., such as silica, that have to be treated to be cationic, it is preferred to use a specific order of addition to increase solids content without adversely affecting the viscosity. This technique includes modifying the inorganic oxide first to be cationic. This avoids viscosity increases that could occur if an anionic inorganic oxide were directly mixed with cationic components of the formula. When inherently cationic inorganic oxides are employed, there are more options available for the order of addition.

Once formulated, the composition can be applied to conventional substrates suitable for inkjet recording media. These substrates generally have a thickness of 10 to 200 $\mu$m and a weight of 20 to 200 g/m$^2$. The substrate can be opaque, translucent or transparent. These substrates specifically include natural pulp paper sheet and plastic sheets. The latter includes sheets comprising polypropylene, polyethylene or polyester. The substrates can also be surface-modified prior to the invention being applied. A composite consisting of two or more of the above-mentioned sheets is also suitable.

The inkjet recording sheet of the present invention is obtained by coating at least one surface of the substrate sheet with the coating composition of this invention and drying the resultant layer to form a coating layer on the substrate sheet surface. In general, the coating composition is applied at rates of about 2 to 20 g/m$^2$ and preferably about 5 to about 10 g/m$^2$. The invention shows acceptable black optical density, feathering, color gamut, water resistance and dry-time at a range of coat weights. However, the invention can also provide these properties at coat weight ranges of 3 to 7 g/m$^2$. This is an advantage when such lower coated weights are required, e.g., as a result of higher paper line speeds.

The coating can be applied online or offline and can be applied using conventional coating methods, such as, air-knife coating, roll coating, blade coating, mayer bar coating, curtain coating, die coating, and processes using metered size presses.

The drying procedure can be carried out at room temperature or by hot air drying method, heat surface-contact drying or heat radiation drying.

Preferred Volume Fractions

Without being bound to a particular theory, it is believed that the composition of this invention can be further defined using relationships thought to exist in dispersions of porous solids. For example, it is known that the viscosity of solids dispersed in fluid media is determined primarily by the fractional occupied volume of the solids in the fluid. For example, the effect of loading of porous particles on the viscosity of a dispersion of those particles in a Newtonian fluid is described by 1. M. Krieger in Adv. Coll. Interface Sci., 1972, 3, 111 by the following formula (1).

$$\frac{\eta}{\eta_0} = \left[1 - \frac{\Phi}{b}\right]^{-ab} \quad (1)$$

wherein $\eta$ is the dispersion's viscosity $\eta_0$ is the viscosity of the fluid in which the particles are dispersed $\phi$ is the volume fraction of the suspension occupied by the particles a is the "intrinsic viscosity" (equal to 2.5 for spherical, or very low aspect ratio uncharged particles)

b is the volume fraction at which the viscosity becomes infinite, and the value of b is between 0.57 and 0.68, depending on shear rate, for non-interacting particles.

When applied to the components of a coating formulation, Equation (1) establishes the upper limit for the solids content of a coating fluid where interparticle interactions are minimal and can be neglected. Where there are several components, one can calculate $\phi_{total}$, the total fractional volume occupied by the components.

In this invention, $\phi_{total}$ described above is estimated as the sum of $\phi_i$ for the individual formulation components, where the densities of the pure, solid compounds at room temperature is used in the calculation for each $\phi_i$. It was found for the formulations of the present invention that for viscosities less than about 2000 cp, $\phi_{total}$ for the formulation should be between about 0.25 and 0.50. Formulations with $\phi_{total}$ are found experimentally to have too high of viscosity, while those with $\phi_{total}$ <0.25 have total solids contents that are too low to be practical. Two thousand centipose is selected because most coating methods need viscosities less than that to be efficiently applied as an online coating. On the other hand, certain coaters, such as blade coaters, can employ coating compositions having viscosities as high as 5000 cp.

Accordingly, one can select combinations of inorganic oxide and binder components so that $\phi_{total}$ falls in the above range. For example, a formulation made by mixing 108.8 gms of silica (92% SiO$_2$, 1.1 cc/g pore volume), 200 gms of polyvinyl alcohol (15% solids), 127.3 gm latex (55% solids) and 110 gm water has a $\phi_{total}$=0.50 and a total solids of 37%. By contrast, if the same weight of a higher porosity silica (e.g., 2.1 cc/g pore volume) is substituted for the silica using 127.3 cc/g in the same formulation, $\phi_{total}$ =0.71. While the total solids of the formulation still is 37%. The high value of $\phi_{total}$ indicates that this formulation has a high viscosity, and thus is unacceptable for on-line applications.

The principles, preferred embodiments, and modes of operation of the present invention have been described in the foregoing specification. The invention which is intended to be protected herein, however, is not to be construed as limited to the particular embodiments disclosed, since these are to be regarded as illustrative rather than restrictive. Variations and changes therefore may be made by those skilled in the art without departing from the spirit of the invention.

Further, any range of numbers recited in the specification or claims, such as that representing a particular set of properties, conditions, physical states or percentages, is intended to literally incorporate expressly herein any number falling within such range, including any subset of numbers within any range so recited.

ILLUSTRATIVE EXAMPLES

Example 1

A coating comprising silica (from Syloid™ W300), Al$_2$O$_3$, polyvinyl alcohol (PVOH), and nonionic latex was prepared to illustrate the invention.

The following proportions of materials were mixed to form a coating formulation: 222 gms Syloid W300 silica; 35 gms alumina sol (23% Al$_2$O$_3$); 200 gms PVOH (15% solids) (Airvol 107 from Air Products); 127 gms latex (55% solids) (Vinac™ XX210 from Air Products); 12.5 gms CP261LV (40% solids) dye mordant from Calgon and 200 gm water. The total solids of this formulation was 27%, and the calculated fractional occupied volume was 0.34.

This coating formulation had a viscosity of 64 cp when measured on a Brookfield Model 5xLVDVII+ with a #3 spindle and in a 150 ml beaker. The coating was applied to a conventional paper substrate using a K Control Coater and a #6 rod. The coated sheets were dried with a heat gun until the gloss of the liquid coating film disappeared, and then were dried for an additional 5 min. at 90° C. in an oven. The sheets were printed with a test pattern using a Hewlett-Packard 870 Cxi printer. The optical density of the a solid-fill black region was measured with an X-Rite 938 spectrodensitometer, and CIE L*a*b* measurements were obtained on solid-fill regions of the colors cyan, magenta, yellow, blue, green and red. Delta E values for each color were calculated with respect to a commercial coated ink-jet sheet (Hewlett-Packard Premium) imaged and measured in the same fashion, and total Delta E values were calculated by summation of the individual Delta E values.

The tendency of the coating to dust was measured qualitatively using a finger rub test, and sheets were rated from 1 to 4 (1=extreme dusting; 4=no observable dusting). Sheet drytime was also qualitatively measured by observing the amount of black ink transferred to an unprinted area. The observed drytimes were also given a number from 1 to 4 (1=extensive ink transfer; 4=no ink transfer).
Results were:

| Black optical density: | 1.53 |
|---|---|
| Total Delta E | 27.2 |
| Dusting | 4 |
| Drytime | 4 |
| Brookfield Viscosity | 64 cp |

Example 2

As a comparison to Example 1, above, the formulation was repeated with the following modifications. Syloid 221 was used as the silica material, and Basoplast 265D, a cationic shell styrenelacrylate copolymer composition latex from BASF was used as the latex. The total solids for this formulation was 22%, while the fractional occupied volume was 0.36.
Results were:

| Black optical density: | 1.62 |
|---|---|
| Total Delta E | 90.0 |
| Dusting | 4 |
| Drytime | 3 |
| Brookfield Viscosity | 90 cp | cp = centipoise

Although the black optical density, viscosity and drytime are acceptable, the color appearance (large Total Delta E with respect to commercial sheet) and low drytime are unacceptable. The Basoplast 265D is not a poly(vinylacetate) latex according to the present invention.

Example 3

As another comparison to Example 1, the formulation of Example 1 was repeated with the following modifications. The latex used was Dow 654 anionic shell styrene/butadiene copolymer latex from Dow Chemical and the silica was a 5μ, 1.8 cc/g silica. The total solids of the formulation was 21%, and the fractional occupied volume was 0.37. The coating formulation gelled when all of the components were mixed, so that it was not possible to coat the substrate.

Example 4

This example demonstrates the advantages of modifying the inorganic oxide surface to create a cationic particle.

(i) Preparation of formula with alumina modified silica: A silica/alumina/water dispersion was prepared by mixing 111.1 g of Syloid™ W300 silica (Grace Davison), 112.5 g deionized water and 17.4 g aluminum chlorhydrol (23% $Al_2O_3$). 100 g of a 15% solids polyvinyl alcohol solution was prepared separately using Airvol 107 (Air Products). To this solution was added 63.6 g of a 55% solids latex suspension, Vinac XX-210 vinyl acetate (Air Products) and 6.2 g of a 40% solution of CP261LV poly diallyl dimethyl ammonium chloride [poly(dadmac)] (Calgon). The final formulation had a 27% by weight total solids (calculated as described below), with a ratio of components of 100:8:30:70:5 $SiO_2$:$Al_2O_3$:PVOH:Latex:Poly(dadmac).

The solids content of the formulation is calculated as the sum of the anhydrous masses for each component divided by the total mass of the fluid. The anhydrous mass of each component is derived from the following values for percent solids: 15% for the PVOH, 48% for the W300 silica, 55% for the Vinac XX-210; and 40% for the poly(dadmac). Measured solids can be somewhat higher than the calculated solids depending on the temperature that is employed to dry the mixture.

(ii) Preparation of formula without an alumina modified silica: A formula was prepared as given in (i), only without the addition of the alumina solution. The final formulation had 27% total solids.

(iii) Evaluations: The low shear viscosity of this formulation was measured using a Brookfield Model LVDV-11+at 60 RPM and a #3 spindle. The high shear viscosity was measured using a Hercules®DV-10 Rheometer at 1100 RPM using the 'E' Bob. Three sheets each of a paper substrate were coated using a #6 rod to give a coat weight of ~16 to 18 gsm. The sheets were printed with a Hewlett-Packard 870Cxi printer, and CIE L*a*b* color measurements and black optical density were measured with an X-rite 938

Spectrophotometer. The average of the values for the three sheets is reported.

Results for the evaluations are given in Table I below.

TABLE 1

Effect of Alumina Modification

| Formulation | Brookfield Viscosity (cp) | Hercules Viscosity (cp) | Black Optical Density |
|---|---|---|---|
| With Modification | 7 | 70 | 1.504 |
| Without Modification | 9 | 92 | 1.316 |

The results clearly show that the addition of alumina produces higher optical density for the black pigmented inks. The results also show that a lower solution viscosity is obtained for the same solids content.

Example 5

This example illustrates the advantages of a nonionic latex (Vinac XX-210) compared to a latex with an anionic shell (Dow 654NA). Latex properties for the latexes are given in Table 2 below. Tg is the glass transition temperature of the latex.

TABLE 2

Properties of Latexes

|  | Dow 654NA | Vinac ™ XX-210 | Basoplast ™ 265D |
|---|---|---|---|
| Part. Size ($\mu$) | 2.15 | 0.2 to 2.0 | 0.7 |
| Tg (° C.) | −10 | 35 | 38 |
| pH | 7.5 | 4.5 to 6.0 | 3 to 4 |
| Core Composition | styrene/butadiene | polyvinylacetate | styrene/acrylate** |
| Shell Composition | low carboxylation | polyvinyl alcohol* | Quat. amine |
| Shell Charge | negative | neutral | positive |

*Partially acetylated
**Hydrophobic

The formulation described in Example 4 (i) was repeated, only the Dow 654NA latex was substituted for the Vinac XX-210. When the components were mixed, the formulation with the anionic latex made a paste which was too viscous to coat paper online (viscosity>>1000 cp).

Table 2 also includes properties of Basoplast 265D from BASF Corporation which was tested in experiments described later below.

Example 6

This example illustrates that the content of the formulation can be increased from about 20% by weight to above 30% by weight on a solids basis and the coating still possesses acceptable viscosities.

A formulation was prepared according to Example 4(i), with the following modifications. First, the alumina solution was first added to the water, followed by addition of the silica. This order of mixing expedites preparation of the silica dispersion. Second, the amount of added water was adjusted to give a final, measured, solids content of 34.3% total solids.

The viscosity of this mixture was measured using a Brookfield Viscosimeter as in Example 4(iii). The viscosity was 650 cp using a #5 spindle at 100 rpm.

TABLE 3

Effect of Solids on Viscosity

| Solids by Weight | Brookfield Viscosity (cps) |
|---|---|
| 34.3 | 636 |
| 33.6 | 224 |
| 32.2 | 120 |
| 30.7 | 100 |
| 29.1 | 76 |
| 27.2 | 60 |
| 25.3 | 48 |
| 23.2 | 40 |
| 21.2 | 32 |

Example 7

These experiments further illustrate the fluid properties and print performance obtained using the particular components of the present invention. These experiments are based on Latin Square experimental designs which were developed to minimize the impact of uncontrolled variables. This experimental design was undertaken to elucidate the effects of experimental variables on coating viscosity and on coated paper properties.

The basic formulation illustrated comprised (a) porous inorganic oxide, (b) water soluble polymer, (c) latex, (d) dye mordant, and (e) crosslinkers, e.g., ammonium zirconium carbonate, AZC 5800M, from Hopton Technologies, Inc.), a crosslinker for polyvinyl alcohol. The ratios of components and total solids were varied as described later below in Table 5.

Formulation variables examined were inorganic oxide pore volume (1.1 cc/g to 2.0 cc/g), inorganic oxide/binder ratio (0.5 to 2.0), particle size ($5\mu$ to $12\mu$), latex type (Dow 654NA, Air Products Vinac XX-210, and BASF 265D; see Table 2 for latex properties), PVOH/latex ratio and coat weight (15 to 30 g/m$^2$). These factors were studied in the following experimental design.

First, five combinations were selected for the variables pore volume and inorganic oxide/binder ratio, corresponding to low-low (1.2 cc/g; 0.5), high-low (2.0 cc/g; 0.5); low-high (1.2 cc/g; 2.0); high-high (2.0 cc/g; 2.0) and intermediate-intermediate (1.6–1.8 cc/g; 1.0). For each of these combinations, a four-factor, three level Hyper-Greco Latin Square (HGLS) Design as shown in Table 4 was created. Thus, for each of the five regions described for pore volume and inorganic oxide/binder ratio, nine additional experiments were run using the HGLS design, giving a total of 45 experiments. Coated sheets were then printed using a Hewlett-Packard 870Cxi ink-jet printer. Color and black optical density were measured with an X-rite 938 spectrophotometer.

TABLE 4

Description of Experimental Design

| Factor Combinations | | | |
|---|---|---|---|
|  | X1 | X2 | X3 |
| R1 | A, 1 | B, 3 | C, 2 |
| R2 | B, 2 | C, 1 | A, 3 |
| R3 | C, 3 | A, 2 | B, 1 |

| Factors | Range |
|---|---|
| Silica Part. Size |  |
| R1 | small ($5\mu$) |
| R2 | medium ($9\mu$) |
| R3 | large ($12\mu$) |
| Latex Type |  |
| X1 | Dow 654 |
| X2 | Vinac XX-210 |
| X3 | Basoplast 265 |
| PVOH/Latex |  |
| A | low (0.43) |
| B | medium (1.0) |
| C | high (2.3) |
| Rod Number |  |
| 1 | #5 (low) |
| 2 | #6 (med.) |
| 3 | #8 (high) |

Properties that were measured were (1) formulation viscosity; (2) coating dusting tendency; (3) paper curl tendency; (4) print mottle severity; (5) print drytime; (6) print color appearance; and (7) pigmented black optical density. Viscosity was measured using a Brookfield viscosimeter as described in the earlier Examples. Dusting tendency was measured qualitatively using a finger rub test, and values were assigned from 1 (extreme dusting tendency) to 4 (no dusting tendency). Paper curl values were assigned from 1 (extreme curl tendency) to 4 (no curl tendency). Print mottle (image non-uniformity) for solid-fill printed areas were assigned values from 1 (extreme mottle) to 4 (no mottle). Print drytime was measured by evaluating the amount of black pigmented ink transferred to an unprinted area which was pressed against the printed area immediately after printing. Drytime values were assigned from 1 (extremely long drytime) to 4 (very short drytime). Print color appearance (T) was measured as described by D. M. Chapman, "Coating Structure Effects on Inkjet Print Quality," Proceedings of the TAPPI Coating Conference 1997, pp 73–93; the higher the color appearance number, the better the color appearance. Black optical density (Black O.D.) was measured using the X-rite 938 spectrophotometer as described earlier.

Results from the experiments are given in Table 5. The average effect of certain variables on measured properties were calculated from the data, and the statistical significance of these average effects was determined using the F—W test.

Columns in Table 5 which contain dashes (-) indicate data that could not be generated because the sample was too viscous, or the coated paper could not receive print to make the measurement.

TABLE 5

| | | | Parts* | | | | | | Paper/Print Qualities | | | | | |
|---|---|---|---|---|---|---|---|---|---|---|---|---|---|---|
| # | Inorganic Oxide | Latex | PV OH | Latex | Total Solids | S/B | Cp | pH | Dust* | Curl* | Mottle | Dry | T | Black O.D. |
| 1 | A | Dow 654NA | 15 | 35 | 20.00 | 2.00 | 592 | 7.8 | 3 | 3 | 4 | 4 | 9.5 | 1.42 |
| 2 | A | Vinac XX-210 | 25 | 25 | 19.00 | 2.00 | 126 | 7.6 | 3 | 3 | 4 | 4 | 9.1 | 1.51 |
| 3 | A | Basoplast 265D | 35 | 15 | 22.00 | 2.00 | 456 | 6.3 | 2 | 3 | 4 | 1 | 8.8 | 1.61 |
| 4 | B | Dow 654NA | 25 | 25 | 19.00 | 2.00 | 376 | 7.6 | 3 | 3 | 4 | 4 | 11.0 | 1.50 |
| 5 | B | Vinac XX-210 | 35 | 15 | 18.00 | 2.00 | 34 | 7.6 | 4 | 3 | 4 | 4 | 11.8 | 1.46 |
| 6 | B | Basoplast 265D | 15 | 35 | 22.00 | 2.00 | 36 | 5.5 | 4 | 3 | 4 | 2 | 8.8 | 1.56 |
| 7 | C | Dow 654NA | 35 | 15 | 18.70 | 2.00 | 88 | 7.7 | 4 | 3 | 4 | 4 | 8.3 | 1.46 |
| 8 | C | Vinac XX-210 | 15 | 35 | 20.00 | 2.00 | 14 | 7.7 | 4 | 3 | 3 | 4 | 9.5 | 1.33 |
| 9 | C | Basoplast 265D | 25 | 25 | 22.00 | 2.00 | 54 | 7.6 | 4 | 3 | 4 | 2 | 11.2 | 1.59 |
| 10 | A | Dow 654NA | 30 | 70 | 27.00 | 0.50 | 1250 | 7.9 | 4 | 3 | 1 | 1 | 2.5 | 1.51 |
| 11 | A | Vinac XX-210 | 50 | 50 | 25.00 | 0.50 | 760 | 8.1 | 4 | 3 | 1 | 1 | 8.0 | 1.50 |
| 12 | A | Basoplast 265D | 70 | 30 | 24.00 | 0.50 | 1132 | 5.3 | 4 | 1 | — | — | 0.0 | — |
| 13 | B | Dow 654NA | 50 | 50 | 25.00 | 0.50 | 3884* | 8.0 | 4 | 2 | 2 | 1 | 7.8 | 1.56 |
| 14 | B | Vinac XX-210 | 70 | 30 | 24.00 | 0.50 | 852 | 8.0 | 4 | 2 | 3 | 1 | 10.2 | 1.48 |
| 15 | B | Basoplast 265D | 30 | 70 | 27.00 | 0.50 | 204 | 4.4 | 4 | 2 | 4 | 2 | 8.6 | 1.63 |
| 16 | C | Dow 654NA | 70 | 30 | 23.00 | 0.50 | 1822 | 7.9 | 4 | 2 | 1 | 2 | 8.6 | 1.60 |
| 17 | C | Vinac XX-210 | 30 | 70 | 27.00 | 0.50 | 538 | 8.1 | 4 | 3 | 2 | 2 | 8.4 | 1.50 |
| 18 | C | Basoplast 265D | 50 | 50 | 26.00 | 0.50 | 1014 | 4.7 | 4 | 2 | 1 | 2 | 3.4 | 1.65 |
| 19 | D | Dow 654NA | 15 | 35 | 18.00 | 2.00 | — | 7.1 | — | — | — | — | 0.0 | — |
| 20 | D | Vinac XX-210 | 25 | 25 | 17.00 | 2.00 | 616 | 7.4 | 2 | 3 | 4 | 4 | 11.4 | 1.53 |
| 21 | D | Basoplast 265D | 35 | 15 | 16.00 | 2.00 | 254 | 6.6 | 2 | 3 | 3 | 3 | 10.3 | 1.44 |
| 22 | E | Dow 654NA | 25 | 25 | 17.00 | 2.00 | 618 | 7.3 | 2 | 3 | 4 | 4 | 11.9 | 1.55 |
| 23 | E | Vinac XX-210 | 35 | 15 | 16.00 | 2.00 | 188 | 7.7 | 2 | 3 | 4 | 4 | 12.0 | 1.61 |
| 24 | E | Basoplast 265D | 15 | 35 | 18.00 | 2.00 | 30 | 5.2 | 3 | 3 | 4 | 3 | 9.5 | 1.50 |
| 25 | F | Dow 654NA | 35 | 15 | 16.00 | 2.00 | 494 | 7.8 | 2 | 3 | 4 | 4 | 12.4 | 1.57 |
| 26 | F | Vinac XX-210 | 15 | 35 | 18.00 | 2.00 | 180 | 7.3 | 3 | 3 | 4 | 4 | 11.7 | 1.55 |
| 27 | F | Basoplast 265D | 25 | 25 | 17.00 | 2.00 | 46 | 5.3 | 3 | 3 | 3 | 3 | 12.5 | 1.63 |
| 28 | D | Dow 654NA | 30 | 70 | 25.00 | 0.50 | — | — | — | — | — | — | 0.0 | — |
| 29 | D | Vinac XX-210 | 50 | 50 | 23.00 | 0.50 | 940 | 7.8 | 4 | 2 | 3 | 3 | 8.9 | 1.42 |
| 30 | D | Basoplast 265D | 70 | 30 | 22.00 | 0.50 | 860 | 5.7 | 4 | 3 | 3 | 1 | 10.4 | 1.51 |
| 31 | E | Dow 654NA | 50 | 50 | 23.00 | 0.50 | 1370* | 7.7 | 4 | 3 | 4 | 3 | 5.1 | 1.49 |
| 32 | E | Vinac XX-210 | 70 | 30 | 22.00 | 0.50 | 780 | 7.7 | 4 | 2 | 3 | 3 | 11.4 | 1.44 |
| 33 | E | Basoplast 265D | 30 | 70 | 24.00 | 0.50 | 1940 | 7.9 | 4 | 2 | 2 | 2 | 1.9 | 1.55 |
| 34 | F | Dow 654NA | 70 | 30 | 22.00 | 0.50 | 3872 | 7.6 | 4 | 2 | 4 | | 9.3 | 1.39 |
| 35 | F | Vinac XX-210 | 30 | 70 | 25.00 | 0.50 | 366 | 7.7 | 4 | 3 | 3 | 3 | 8.8 | 1.51 |
| 36 | F | Basoplast 265D | 50 | 50 | 23.00 | 0.50 | 1130 | 7.8 | 4 | 2 | 2 | 1 | 0.0 | — |
| 37 | G | Dow 654NA | 30 | 70 | 21.00 | 1.00 | — | — | — | — | — | — | 0.0 | — |
| 38 | G | Vinac XX-210 | 50 | 50 | 21.00 | 1.00 | 714 | 7.7 | 4 | 3 | 3 | 3 | 7.9 | 1.43 |
| 39 | G | Basoplast 265D | 70 | 30 | 22.00 | 1.00 | 750 | 5.5 | 4 | 3 | 4 | 2 | 7.5 | 1.52 |
| 40 | H | Dow 654NA | 50 | 50 | 22.00 | 1.00 | 974 | 7.7 | 4 | 3 | 4 | 3 | 9.2 | 1.44 |
| 41 | H | Vinac XX-210 | 70 | 30 | 21.00 | 1.00 | 320 | 7.6 | 4 | 3 | 3 | 3 | 10.7 | 1.49 |
| 42 | H | Basoplast 265D | 30 | 70 | 22.00 | 1.00 | 90 | 4.5 | 4 | 3 | 3 | 2 | 4.0 | 1.62 |
| 43 | H | Dow 654NA | 70 | 30 | 20.00 | 1.00 | 1150 | 7.8 | 4 | 3 | 4 | 4 | 10.5 | 1.43 |
| 44 | H | Vinac XX-210 | 30 | 70 | 21.00 | 1.00 | 96 | 7.7 | 4 | 2 | 4 | 4 | 11.0 | 1.41 |
| 45 | H | Basoplast 265D | 50 | 50 | 22.00 | 1.00 | 310 | 4.7 | 4 | 2 | 4 | 2 | 8.0 | 1.58 |

*Parts binder per 100 parts silica (solids basis)
PVOH — polyvinyl alcohol
O.D. — Optical density
S/B — Silica to binder ratio based on weight
Cp — centipose as determined by Brookfield viscosimeter
T — Color Appearance
A — Syloid ™ 74 x 6500 silica from Grace Davison
B — Syloid ™ 74 silica from Grace Davison
C — Sylojet ™ P612 silica from Grace Davison
D — Sylojet ™ P405 silica from Grace Davison
E — Sylojet ™ P409 silica from Grace Davison
F — Sylojet ™ P412 silica from Grace Davison
G — Developmental silica (12μ average particle size, 1.8 cc/g pore volume)

Figure 2:
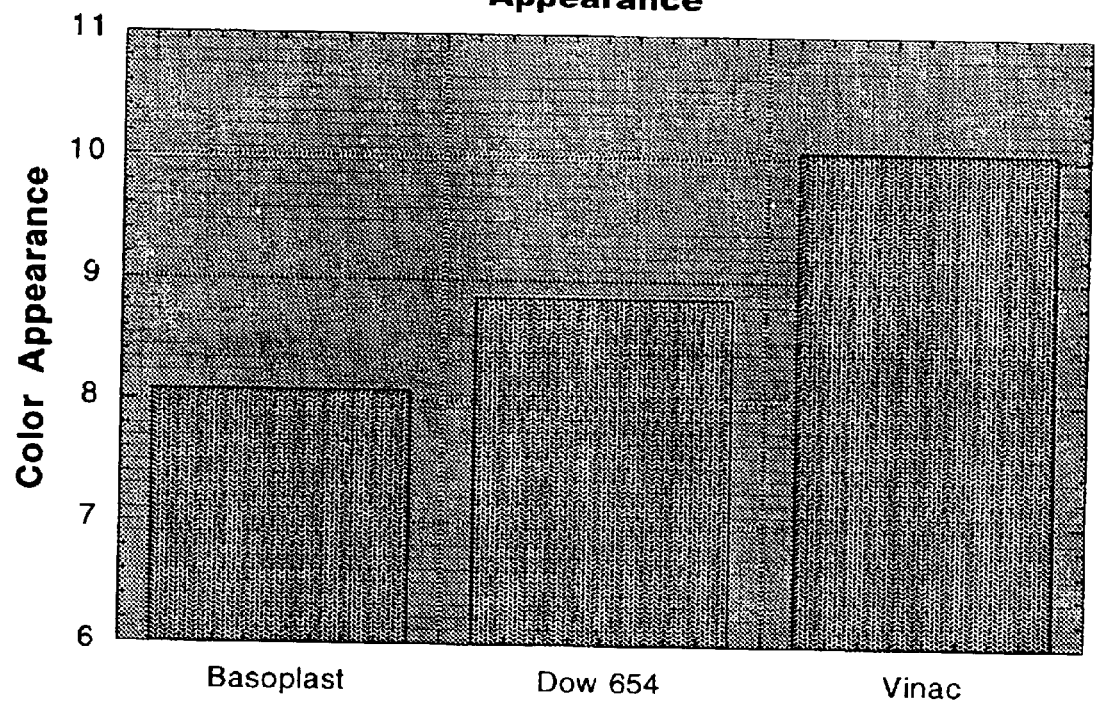
FIG. 2 illustrates and compares the color appearance which the invention imparts to coated paper compared to other coatings, with the color appearance being determined using a methodology in which higher numbers reflect higher quality color appearance.
Figure 3:
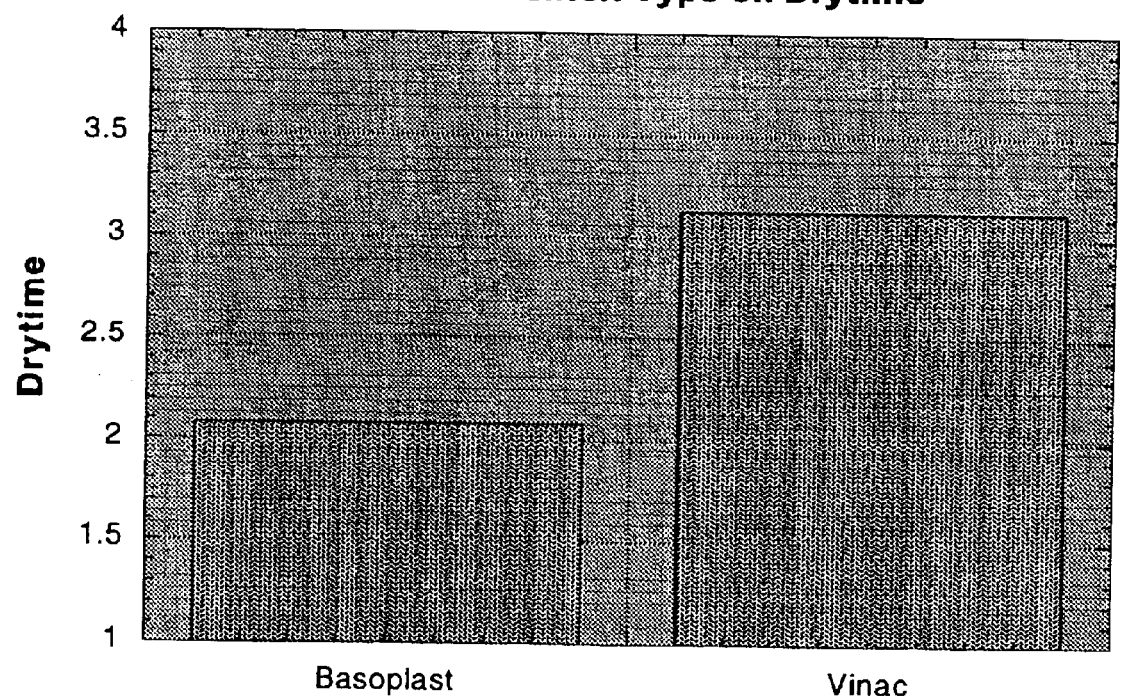
FIG. 3 illustrates and compares the time it takes to dry an image printed on media of the invention compared to the drytime of other coated media. The drytimes reflected in this figure were given quality numbers, with higher numbers reflecting longer drytimes.

FIGS. 1 through 3 reflect data from Table 5 and show the advantages the invention has in terms of high solids, low viscosity, color appearance, and drytime. For example, FIG. 1 shows the effect latex charge has on the formulation. FIG. 1 shows that, on average, the non-ionic Vinac XX-210 latex gives a lower formulation viscosity at equal solids on an average basis, i.e., 21% by weight, than the anionic, Dow 654NA latex as described in Example 5. FIG. 2 shows that, on average, a nonionic latex gives better color appearance than both the anionic latex and the 265D latex. FIG. 3 shows better drytime for the nonionic latex compared to the 265D latex. Since it is believed that these properties are more strongly affected by the latex core composition than the shell composition, it is believed that a vinylacetate core w composition is preferred. The effects illustrated in the FIGS. 1–3 are average effects and do not reflect the effect of any one sample from Table 5.

Figure 4:
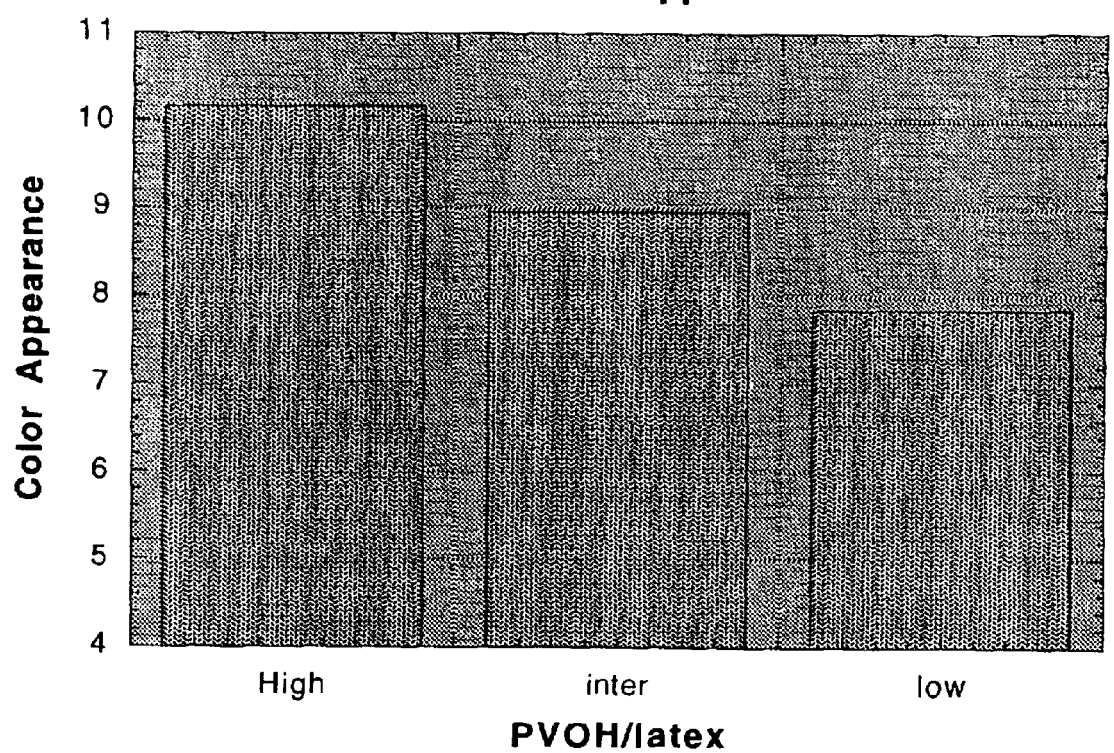
FIG. 4 illustrates how the weight ratio of water soluble polymer to nonionic latex components used to formulate the invention affects color appearance of images printed on paper coated with the invention.
Figure 5:
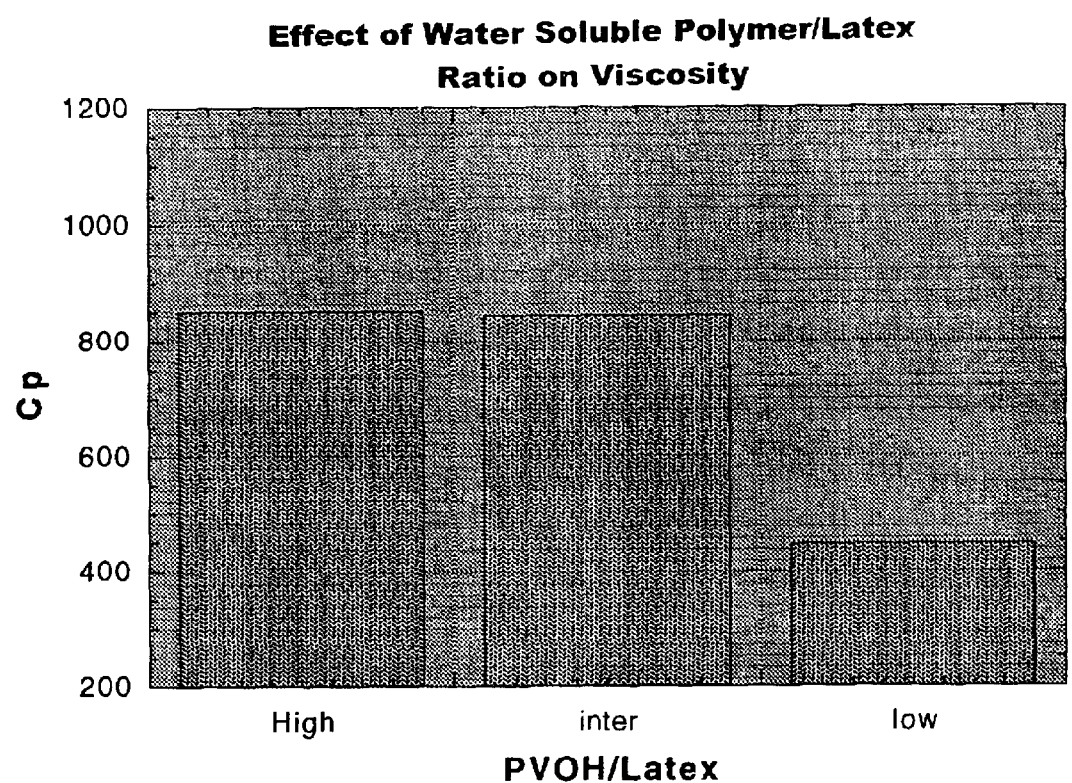
FIG. 5 illustrates the effect that the weight ratio of water soluble polymer to nonionic latex has on viscosity of the invention.
Figure 6:
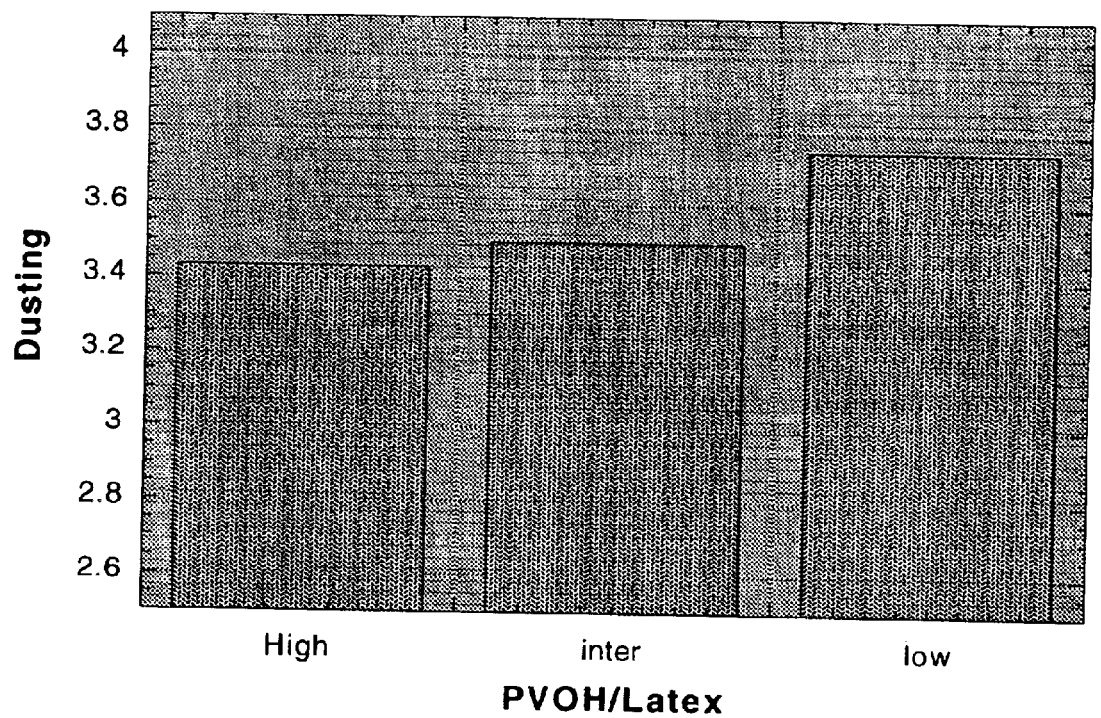
FIG. 6 illustrates how the weight ratio of water soluble polymer to nonionic latex components affects the dusting tendency of the invention after it has been dried.

FIGS. 4 through 6 illustrate preferred binder amounts. FIG. 4 illustrates the range of properties that can be achieved by varying the water soluble polymer/latex ratio. FIG. 4 demonstrates that formulations rich in PVOH exhibit good color appearance while FIGS. 5 and 6 illustrate that formulations rich in PVOH also have relatively higher viscosity and high tendency to dust. By contrast, formulations rich in latex have a lower tendency to dust and a more preferable viscosity. As with FIGS. 1–3, FIGS. 4–6 show average effects calculated from the data appearing in Table 5.

What is claimed:

1. A coating composition comprising
   (a) non-ionic latex polymer;
   (b) porous inorganic oxide having a pore volume in the range of 0.6 to 3.0 cc/g wherein the inorganic oxide further possesses a cationic charge; and
   (c) water soluble polymer
   wherein the coating composition has a solids content of at least 20% by weight and has a Brookfield viscosity of 5000 centipose or less.

2. A composition of claim 1 wherein (a) is polyvinyl acetate.

3. A composition of claim 2 wherein (a) is polyvinyl acetate homopolymer.

4. A composition of claim 2 wherein the polyvinyl acetate has a core and shell, further wherein the shell comprises polyvinyl alcohol.

5. A composition of claim 1 wherein the porous inorganic oxide is silica.

6. A composition of claim 5 wherein the silica has a pore volume in the range of 0.9 to 2.5 cc/g.

7. A composition of claim 5 wherein the silica has a coating comprising alumina.

8. A composition of claim 1 wherein the water soluble polymer is a member of the group consisting of polyvinyl alcohol, hydroxyethyl cellulose, methyl cellulose, dextrin, pluran, gelatin, starch, gum arabic, dextran, polyethylene glycol, polyvinyl pyrrolidone, polyacrylamide, polypropylene glycol and mixtures thereof.

9. A composition of claim 4 wherein the water soluble polymer is polyvinyl alcohol.

10. A composition of claim 1 further comprising (d) a water soluble cationic polymer.

11. A composition of claim 10 wherein (d) comprises quaternary ammonium.

12. A composition of claim 11 wherein (d) is a polydiallyl dimethyl ammonium chloride.

13. A composition of claim 1 wherein the solids content of the composition is in the range of about 25 to about 40% by weight.

14. A high solids coating composition comprising
    (a) polyvinyl alcohol;
    (b) nonionic latex; and
    (c) surface-modified porous inorganic oxide wherein the coating solids has a total volume fraction in the range of 0.25 to 0.50.

15. A coating according to claim 14 wherein the solids content is greater than 23% by weight.

16. A coating composition according to claim 14 further comprising dye mordant.

17. A coating composition according to claim 16 wherein the dye mordant is cationic polymer.

18. A coating composition according to claim 14 wherein the weight ratio of (b) to (a) is in the range of 0.2 to 5.0.

19. A coating composition according to claim 14 wherein the coating composition has a Brookfield viscosity of less than 2000 centipose.

20. A coating composition according to claim 14 wherein (b) comprises polyvinylacetate.

21. A coating composition according to claim 14 wherein the inorganic oxide is silica which has been modified by alumina.

* * * * *